United States Patent
Sun et al.

(10) Patent No.: US 10,771,798 B2
(45) Date of Patent: Sep. 8, 2020

(54) MULTI-STREAM IMAGE PROCESSING APPARATUS AND METHOD OF THE SAME

(71) Applicant: Xiamen Sigmastar Technology Ltd., Xia'men (CN)

(72) Inventors: Ming-Yong Sun, Shanghai (CN); Hao Wang, Shanghai (CN)

(73) Assignee: XIAMEN SIGMASTAR TECHNOLOGY LTD., Xia'men (CN)

( * ) Notice: Subject to any disclaimer, the term of this patent is extended or adjusted under 35 U.S.C. 154(b) by 0 days.

(21) Appl. No.: 16/511,668

(22) Filed: Jul. 15, 2019

(65) Prior Publication Data

US 2020/0213601 A1   Jul. 2, 2020

(30) Foreign Application Priority Data

Dec. 26, 2018 (CN) .......................... 2018 1 1602356

(51) Int. Cl.
    *H04N 19/40* (2014.01)
    *H04N 19/42* (2014.01)
    (Continued)

(52) U.S. Cl.
    CPC ............. *H04N 19/40* (2014.11); *G06T 1/20* (2013.01); *H04N 19/176* (2014.11); *H04N 19/42* (2014.11); *H04N 19/44* (2014.11)

(58) Field of Classification Search
    CPC .... H04N 19/61; H04N 13/161; H04N 13/194; H04N 19/112; H04N 19/16;
    (Continued)

(56) References Cited

U.S. PATENT DOCUMENTS 5,351,085 A * 9/1994 Coelho ............... H04N 7/54
                                               348/391.1
5,367,629 A * 11/1994 Chu ..................... G06T 9/008
                                               375/240.12
(Continued)

FOREIGN PATENT DOCUMENTS

CN    102301729 A    12/2011
TW    200842819      11/2008

OTHER PUBLICATIONS

OA letter of the counterpart TW application (appl. No. 108101589) dated Aug. 14, 2019. Summary of OA letter: (1) Claims 1-4, 6, 8-11 and 13 and paragraph [0024] of the specification are indefinite and thus should be amended. (2) Claims 1-2, 7-9 and 14 are obvious to those of ordinary skill in the art due to the disclosure of references 1&2(TW 200842819A & CN 102301729A).

*Primary Examiner* — Negussie Worku
(74) *Attorney, Agent, or Firm* — WPAT, PC

(57) ABSTRACT

The present disclosure discloses a multi-stream image processing method that includes steps outlined below. Image streams that include a main image stream and at least one sub image stream are generated by a former stage circuit, wherein a resolution of the main image stream is higher than the resolution of the sub image stream. Within an image frame processing time period, a N-th sub image frame is stored in a current sub image storage block in a memory module and a N-th main image frame is stored in a current main image storage block in the memory module by the former stage circuit. Within a first sub period of the image frame processing time period, a N−1-th sub image frame is read from a former sub image storage block in the memory module by a latter stage circuit to perform processing. Within a second sub period of the image frame processing time period, the N-th main image frame is read by the latter stage circuit to perform processing.

14 Claims, 9 Drawing Sheets

(51) Int. Cl.
*G06T 1/20* (2006.01)
*H04N 19/176* (2014.01)
*H04N 19/44* (2014.01)

(58) Field of Classification Search
CPC ...... H04N 19/176; H04N 19/33; H04N 19/46;
H04N 19/587; H04N 19/597; H04N
19/60; H04N 19/85; H04N 21/2365;
H04N 21/2383; H04N 21/4347; H04N
21/4382; H04N 17/004; H04N 19/467;
H04N 21/2547; H04N 21/25891; H04N
21/44008; H04N 21/8352; H04N 7/173;
H04N 5/765; H04N 5/85; H04N 9/8227;
H04N 5/781; H04N 13/189; H04N
13/204; H04N 13/239; H04N 13/257;
H04N 13/275; H04N 5/225; H04N 5/232;
H04N 5/3765; H04N 5/378; H04N 5/772;
H04N 5/907; H04N 9/7921; H04N 9/804;
H04N 9/8042; H04N 9/8063; H04N
9/8205; H04N 21/4786; H04N 21/4788;
H04N 21/4882; H04N 21/4884; H04N
21/8153; H04N 21/8455; H04N 5/76;
H04N 5/775; H04N 5/783; H04N 9/8211;
G11B 27/105; G11B 27/034; G11B
2220/2562; G11B 27/28; G11B 27/329;
G11B 2220/20; G11B 2220/41; G11B
27/34; G11B 27/3027; G06K 9/00711;
G06F 16/7847; G06F 16/78; G06F
16/743; G06F 16/739; G06F 16/784;
G06F 16/785; G06F 16/7857; G06F
16/9562; H04H 20/14; H04H 2201/90;
H04H 60/37; H04H 60/59; G03B 17/56;
G09G 2310/04; G09G 2320/103; G09G
2330/021; G09G 5/393
USPC .................................................. 358/448, 474
See application file for complete search history.

(56) References Cited

U.S. PATENT DOCUMENTS

| | | | | |
|---|---|---|---|---|
| 5,432,554 | A * | 7/1995 | Nickerson | G06F 3/14 348/391.1 |
| 5,488,570 | A * | 1/1996 | Agarwal | H04N 7/15 345/501 |
| 8,405,678 | B2 | 3/2013 | Cheng et al. | |
| 8,933,988 | B2 | 1/2015 | Ishii et al. | |
| 2006/0153296 | A1* | 7/2006 | Deng | G06K 9/00711 375/240.12 |
| 2010/0111489 | A1* | 5/2010 | Presler | H04N 5/232 386/278 |
| 2011/0280300 | A1* | 11/2011 | Tourapis | H04N 13/161 375/240.2 |
| 2012/0033933 | A1* | 2/2012 | Suzuki | G06K 9/00711 386/230 |
| 2012/0057775 | A1* | 3/2012 | Suzuki | H04N 5/76 382/154 |
| 2012/0127367 | A1* | 5/2012 | Glen | G09G 5/393 348/571 |
| 2013/0073946 | A1* | 3/2013 | Kang | G06F 16/986 715/234 |
| 2015/0156469 | A1* | 6/2015 | Qu | H04N 9/8715 348/43 |
| 2018/0227586 | A1* | 8/2018 | Choi | H04N 19/31 |
| 2019/0045136 | A1* | 2/2019 | Nakayama | H04N 5/23232 |
| 2020/0204811 | A1* | 6/2020 | Sun | H04N 19/182 |

* cited by examiner

MULTI-STREAM IMAGE PROCESSING APPARATUS AND METHOD OF THE SAME

BACKGROUND OF THE INVENTION

1. Field of the Invention

The present disclosure relates to a multi-stream image processing technology, especially to a multi-stream image processing apparatus and method of the same.

2. Description of Related Art

In some applications of the image processing technology, a plurality of image streams are generated according to the same image source. For example, after retrieving the images of the environment, an IP camera may generate a plurality of image streams, while some image streams having higher resolution can be displayed as higher resolution frames on a corresponding display module, and some image streams having lower resolution can be displayed on a display module having a lower resolution to provide an instant surveillance mechanism.

However, a plurality of corresponding circuits are required to perform image processing on a plurality of image streams. The cost of the circuits is thus increased.

SUMMARY OF THE INVENTION

In consideration of the problem of the prior art, an object of the present disclosure is to provide a multi-stream image processing apparatus and a multi-stream image processing method to perform process on a plurality of image streams by using a single latter stage circuit with a time-division method to avoid the high cost of disposition of a multiple of latter stage circuits.

The present disclosure discloses a multi-stream image processing method that includes steps outlined below. A plurality of image streams are generated by a former stage circuit according to a same image source, wherein the image streams comprises a main image stream and at least one sub image stream, and a resolution of the main image stream is higher than a resolution of the sub image stream. Within an image frame processing time period, a N-th sub image frame of the sub image stream is stored by the former stage circuit in at least one current sub image storage block of a memory module and a N-th main image frame of the main image stream is stored by the former stage circuit in a main image storage block of the memory module. Within a first sub period of the image frame processing time period, a N−1-th sub image frame of the sub image stream stored in a previous sub image storage block of the memory module is read by a latter stage circuit and the N−1-th sub image frame is processed by the latter stage circuit. Within a second sub period of the image frame processing time period behind the first sub period, the N-th main image frame stored in the main image storage block is read by the latter stage circuit and the N-th main image frame is processed by the latter stage circuit.

The present disclosure also discloses a multi-stream image processing apparatus that includes a memory module, a former stage circuit, a latter stage circuit and a processing circuit. The processing circuit is electrically coupled to the memory module, the former stage circuit and the latter stage circuit, and is configured to execute a plurality of software or firmware executable commands to execute a multi-stream image processing method. The multi-stream image processing method includes steps outlined below. A plurality of image streams are generated by the former stage circuit according to a same image source, wherein the image streams comprises a main image stream and at least one sub image stream, and a resolution of the main image stream is higher than a resolution of the sub image stream. Within an image frame processing time period, a N-th sub image frame of the sub image stream is stored by the former stage circuit in at least one current sub image storage block of a memory module and a N-th main image frame of the main image stream is stored by the former stage circuit in a main image storage block of the memory module. Within a first sub period of the image frame processing time period, a N−1-th sub image frame of the sub image stream stored in a previous sub image storage block of the memory module is read by the latter stage circuit and the N−1-th sub image frame is processed by the latter stage circuit. Within a second sub period of the image frame processing time period behind the first sub period, the N-th main image frame stored in the main image storage block is read by the latter stage circuit and the N-th main image frame is processed by the latter stage circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a multi-stream image processing apparatus and a multi-stream image processing method to perform process on a plurality of image streams by using a single latter stage circuit with a time-division method to avoid the high cost of disposition of a multiple of latter stage circuits.

Figure 1:
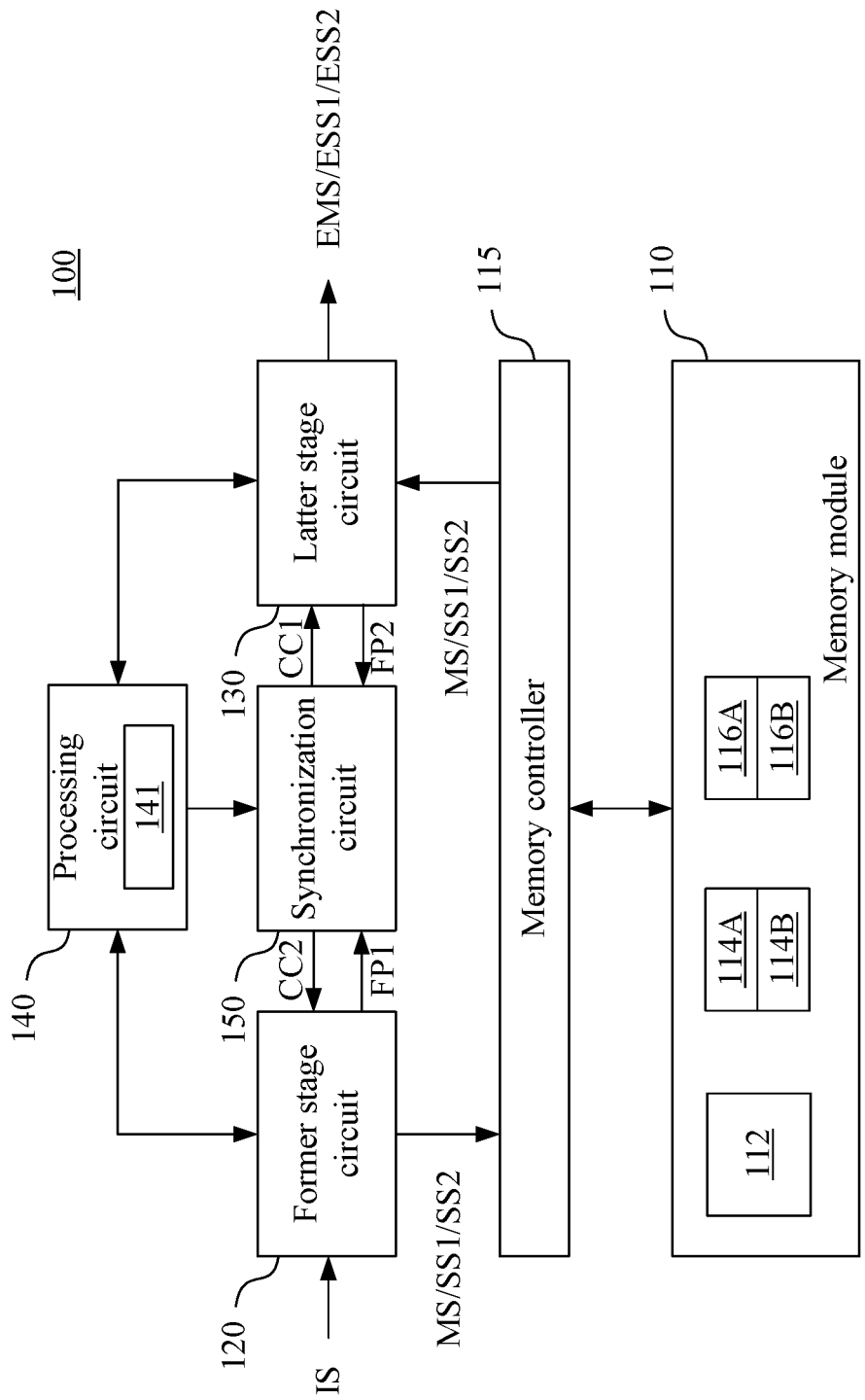
FIG. 1 is a block diagram of a multi-stream image processing apparatus in an embodiment of the present invention.

Reference is now made to FIG. 1. FIG. 1 is a block diagram of a multi-stream image processing apparatus 100 in an embodiment of the present invention. The multi-stream image processing apparatus 100 is able to retrieve the images of an environment to generate a plurality of image streams MS (main image stream), SS1 (first sub image stream) and SS2 (second sub image stream) according to the same image source IS and subsequently perform processing on the image streams MS, SS1 and SS2 to generate a processed main image stream EMS, a processed first sub image stream ESS1 and a processed second sub image stream ESS2.

The multi-stream image processing apparatus 100 includes a memory module 110, a former stage circuit 120, a latter stage circuit 130, a processing circuit 140 and a synchronization circuit 150.

In an embodiment, the memory module 110 has different blocks to store different data required to process the plurality of image streams. The memory module 110 can be implemented by a memory having a higher speed such as, but not limited to a double data rate synchronous dynamic random access memory (DDR SDRAM).

In an embodiment, the multi-stream image processing apparatus 100 may further include a memory controller 115. The memory controller 115 can be implemented by such as, but not limited to a memory interface unit (MIU). Other circuit modules in the multi-stream image processing apparatus 100, e.g. the former stage circuit 120 and the latter stage circuit 130, can perform read operation and write operation on the memory module 110 through the memory controller 115 to store data in the memory module 110 or retrieve data from the memory module 110.

In an embodiment, the former stage circuit 120 is an image signal processor (ISP) configured to generate the plurality of image streams MS, SS1 and SS2 according to the same image source IS. The image source IS can be such as, but not limited to image sensing components in an IP camera. After the image sensing components sense the image, the former stage circuit 120 generates the image streams MS, SS1 and SS2 accordingly and stores the image streams MS, SS1 and SS2 having different resolutions in the memory module 110 through the memory controller 115.

The image stream MS is a main image stream and the image streams SS1 and SS2 are respectively a first sub image stream and a second sub image stream. The resolution of the main image stream MS is higher than the resolution of the first sub image stream SS1 and the resolution of the second sub image stream SS2. In an embodiment, the resolution of the main image stream MS is 4K, The resolution of the first sub image stream SS1 is 1280×720. The resolution of the second sub image stream SS2 is 720×576. It is appreciated that the number of the sub image streams and the resolution of each of the image streams described above are merely an example. The present invention is not limited thereto. In an embodiment, the number of the sub image stream can be one or more than one.

In an embodiment, the latter stage circuit 130 is an encoder configured to read the image streams MS, SS1 and SS2 from the memory module 110 through the memory controller 115 to perform encoding process and generate the processed main image stream EMS, the processed first sub image stream ESS1 and the processed second sub image stream ESS2 that are finished being encoded. In different embodiments, the encoding process is performed based on such as, but not limited to H264, H265 or other encoding standards.

The synchronization circuit 150 is electrically coupled to the former stage circuit 120, the latter stage circuit 130 and the processing circuit 140 and is configured to, according to the control of the processing circuit 140, balance the speed that the former stage circuit 120 stores the image stream to the memory module 110 and the speed that the latter stage circuit 130 reads the image stream from the memory module 110.

The processing circuit 140 is electrically coupled to the memory module 110, the former stage circuit 120, the latter stage circuit 130 and the synchronization circuit 150. The processing circuit 140 can execute software or firmware executable commands 141 to perform the function of the multi-stream image processing apparatus 100. More specifically, the processing circuit 140 can retrieve the software or firmware executable commands 141 from a storage module (not illustrated) included in the multi-stream image processing apparatus 100, in which the software or firmware executable commands 141 include such as, but not limited to firmware of the former stage circuit 120, the latter stage circuit 130 and the synchronization circuit 150 and other related commands for operating and controlling the former stage circuit 120, the latter stage circuit 130 and the synchronization circuit 150. The processing circuit 140 further operates and controls the former stage circuit 120, the latter stage circuit 130 and the synchronization circuit 150 accordingly to perform the storing, reading and encoding of the image streams MS, SS1 and SS2 and generate the processed main image stream EMS, the processed first sub image stream ESS1 and the processed second sub image stream ESS2.

It is appreciated that in an embodiment, the storage module can be implemented by another memory independent from the memory module 110. For example, the storage module can be implemented by such as, but not limited to a optical disk, a random access memory (RAM), a read only memory (ROM), a floppy disk, a hard drive or a CD-ROM. In another embodiment, the storage module can also be implemented together with the memory module 110 as a single memory.

Figure 2:
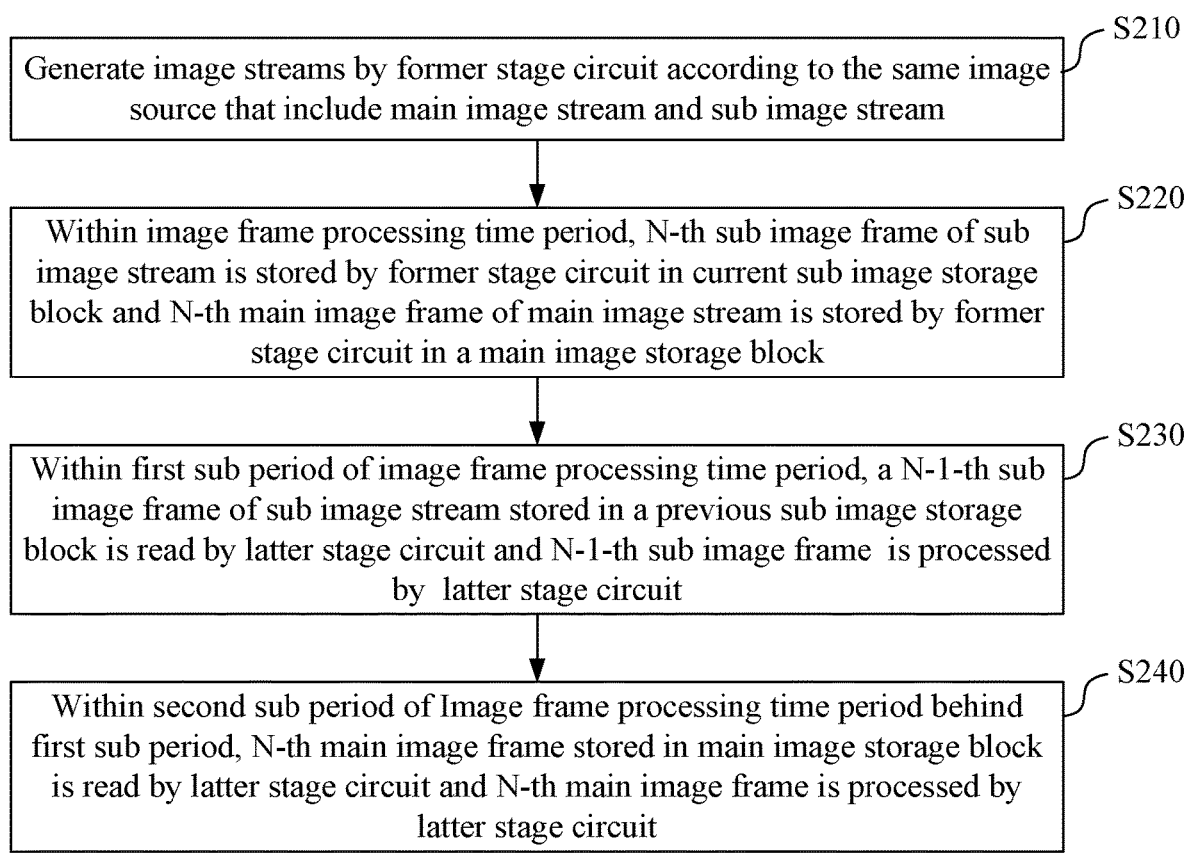
FIG. 2 is a flow chart of a multi-stream image processing method in an embodiment of the present invention.

Reference is now made to FIG. 2 at the same time. The detail function of the multi-stream image processing apparatus 100 is further described in accompany with FIG. 1 and FIG. 2 in the following paragraphs.

FIG. 2 is a flow chart of a multi-stream image processing method 200 in an embodiment of the present invention. The multi-stream image processing method 200 can be used in the multi-stream image processing apparatus 100 illustrated in FIG. 1. In an embodiment, the multi-stream image processing method 200 includes the steps illustrated in FIG. 2.

Step S210: a plurality of image streams MS, SS1 and SS2 are generated by the former stage circuit 120 according to the same image source IS. As described above, image streams MS, SS1 and SS2 include the main image stream MS, the first sub image stream SS1 and the second sub image stream SS2. The resolution of the main image stream MS is higher than the resolution of each of the first and the second sub image streams SS1 and SS2.

Step S220: Within an image frame processing time period, a N-th sub image frame of the sub image stream SS1 is stored by the former stage circuit 120 in the current first sub image storage block 114A of the memory module 110, a N-th sub image frame of the sub image stream SS2 is stored by the former stage circuit 120 in the current second sub image storage block 116A of the memory module 110, and a N-th main image frame of the main image stream MS is stored by the former stage circuit 120 in a main image storage block 112 of the memory module 110. N is a positive integer.

Figure 3:
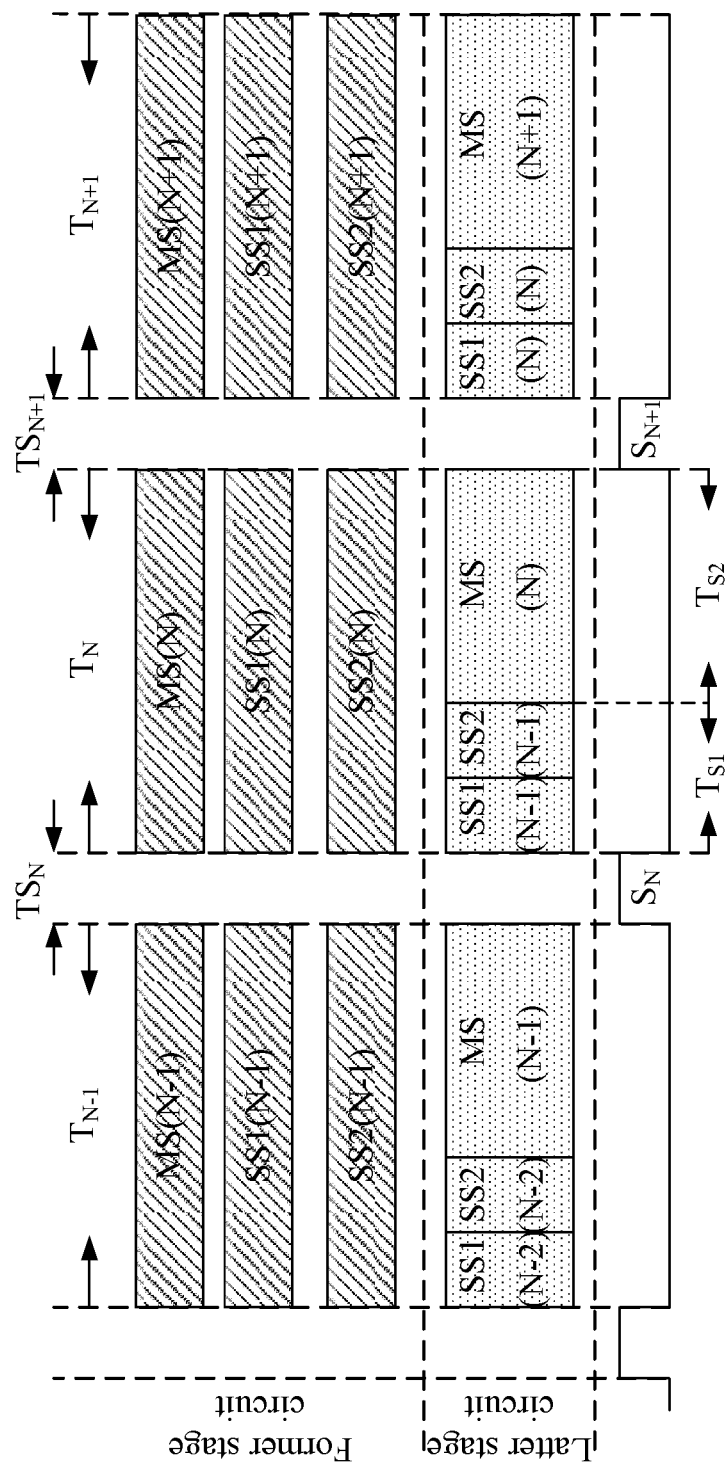
FIG. 3 is a timing diagram of the image processing performed by the multi-stream image processing apparatus in an embodiment of the present invention.

Reference is now made to FIG. 3 at the same time. FIG. 3 is a timing diagram of the image processing performed by the multi-stream image processing apparatus 100 in an embodiment of the present invention.

The time sequence during the processing of the multi-stream image processing apparatus 100 includes a plurality of image frame processing time periods, such as the consecutive three image frame processing time periods $T_{N-1}$, $T_N$ and $T_{N+1}$ exemplarily illustrated in FIG. 3. Each two adjacent image frame processing time periods include a synchronization signal time period therebetween, such as the synchronization signal time period $TS_N$ between the image frame processing time periods $T_{N-1}$ and $T_N$, and the synchronization signal time period $TS_{N+1}$ between the image frame processing time periods $T_N$ and $T_{N+1}$. The synchronization signal time periods $TS_N$ and $TS_{N+1}$ respectively correspond to the transmission of the synchronization signals $S_N$ and $S_{N+1}$ and respectively mark the beginning of the image frame processing time periods $T_N$ and $T_{N+1}$.

In the present embodiment, within the synchronization signal time periods $TS_N$ and $TS_{N+1}$, both of the former stage circuit 120 and the latter stage circuit 130 do not perform data processing. The former stage circuit 120 and the latter stage circuit 130 only perform data processing within the image frame processing time periods $T_{N-1}$, $T_N$ and $T_{N+1}$.

In FIG. 3, the time periods corresponding to the processing of the former stage circuit 120 is illustrated as blocks having slashes. Since the former stage circuit 120 can simultaneously generate the image streams MS, SS1 and SS2, the former stage circuit 120 simultaneously stores the N-th sub image frame of the sub image stream SS1 in the current first sub image storage block 114A, stores the N-th sub image frame of the sub image stream SS2 in the current second sub image storage block 116A and stores the N-th main image frame of the main image stream MS in the main image storage block 112 after the image frame processing time period $T_N$ begins.

Step S230: Within a first sub period $T_{S1}$ of the image frame processing time period $T_N$, a N−1-th sub image frame of the sub image stream SS1 stored in a previous first sub image storage block 114B of the memory module 110 is read by the latter stage circuit 130 and a N−1-th sub image frame of the sub image stream SS2 stored in a previous second sub image storage block 116B of the memory module 110 is read by the latter stage circuit 130. The N−1-th sub image frame of the sub image stream SS1 and the N−1-th sub image frame of the sub image stream SS2 are processed by the latter stage circuit 130.

In an embodiment, as illustrated in FIG. 3, within the image frame processing time period $T_{N-1}$, the N−1-th sub image frame of the sub image stream SS1 and the N−1-th sub image frame of the sub image stream SS2 are respectively stored in the previous first sub image storage block 114B and the previous second sub image storage block 116B by the former stage circuit 120 through the memory controller 115.

The time periods corresponding to the processing of the latter stage circuit 130 is illustrated as blocks having dots. The latter stage circuit 130 is operated by using a time-division method to process one image frame in one time period. As illustrated in FIG. 3, within the first sub period $T_{S1}$, the latter stage circuit 130 first reads the N−1-th sub image frame corresponding to the first sub image stream SS1 from the previous first sub image storage block 114B and processes the N−1-th sub image frame to generate the image frame corresponding to the processed first sub image stream ESS1. Subsequently, within the remained time period within the first sub period $T_{S1}$, the latter stage circuit 130 reads the N−1-th sub image frame corresponding to the second sub image stream SS2 from the previous second sub image storage block 116B and processes the N−1-th sub image frame to generate the image frame corresponding to the processed second sub image stream ESS2.

Step S240: Within a second sub period $T_{S2}$ of the image frame processing time period $T_N$ behind the first sub period $T_{S1}$, the N-th main image frame stored in the main image storage block 112 is read by the latter stage circuit 130 and the N-th main image frame is processed by the latter stage circuit 130.

In an embodiment, a capacity of the main image storage block 112 is larger than or equals to a size of the N-th main image frame. In some embodiments, the operation speed of the latter stage circuit 130 may be faster than the operation speed of the former stage circuit 120. As a result, in order to avoid the occurrence of the condition that the speed that the latter stage circuit 130 reads data from the main image storage block 112 exceeds the speed that the former stage circuit 120 stores data to the main image storage block 112, the synchronization circuit 150 performs coordination and synchronization between the former stage circuit 120 and the latter stage circuit 130.

Figure 4:
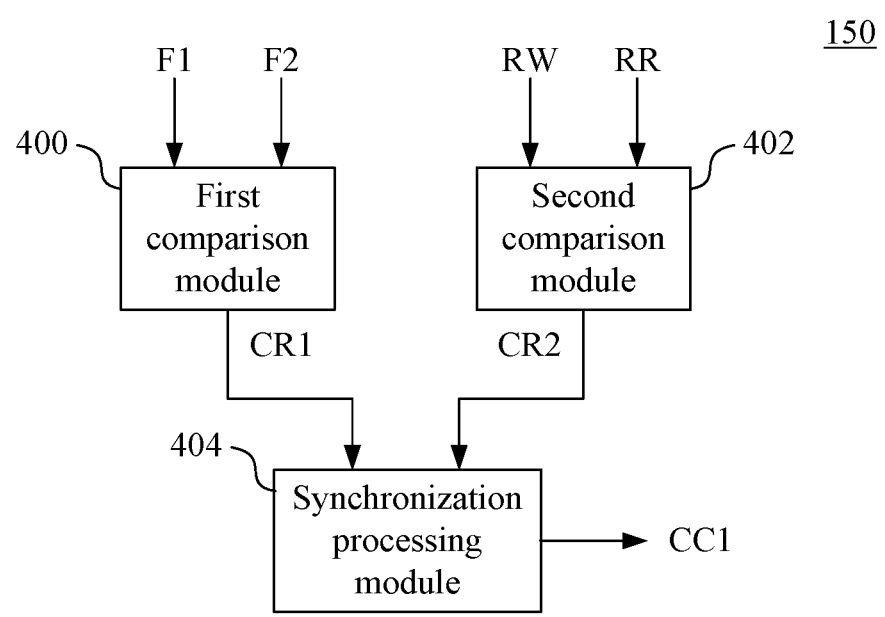
FIG. 4 is a block diagram of the synchronization circuit in an embodiment of the present invention.

Reference is now made to FIG. 4. FIG. 4 is a block diagram of the synchronization circuit 150 in an embodiment of the present invention.

As illustrated in FIG. 4, the synchronization circuit 150 includes a first comparison module 400, a second comparison module 402 and a synchronization processing module 404.

The first comparison module 400 and the second comparison module 402 can retrieve frame processing information FP1 and FP2 from the former stage circuit 120 and the latter stage circuit 130 respectively. The frame processing information FP1 includes a former stage frame number F1 and a storing row number RW of the image frame that the former stage circuit 120 currently stores. The frame processing information FP2 includes a latter stage frame number F2 and a reading row number RR of the image frame that the latter stage circuit 130 currently reads.

In an embodiment, the first comparison module 400 performs comparison according to the former stage frame number F1 of the image frame that the former stage circuit 120 currently stores and the latter stage frame number F2 of the image frame that the latter stage circuit 130 currently reads to determine whether the image frame that the former stage circuit 120 currently stores and the image frame that the latter stage circuit 130 currently reads are the same image frame. The second comparison module 402 performs comparison according to the storing row number RW of the image frame that the former stage circuit 120 currently stores and the reading row number RR of the image frame that the latter stage circuit 130 currently reads to determine whether the reading row number RR of the image frame that the latter stage circuit 130 currently reads exceeds the storing row number RW of the image frame that the former stage circuit 120 currently stores.

The synchronization processing module 404 further determines the operation condition of the former stage circuit 120 and the latter stage circuit 130 according to the comparison results of the first comparison module 400 and the second comparison module 402 to further determines the synchronization strategy being used.

Figure 5:
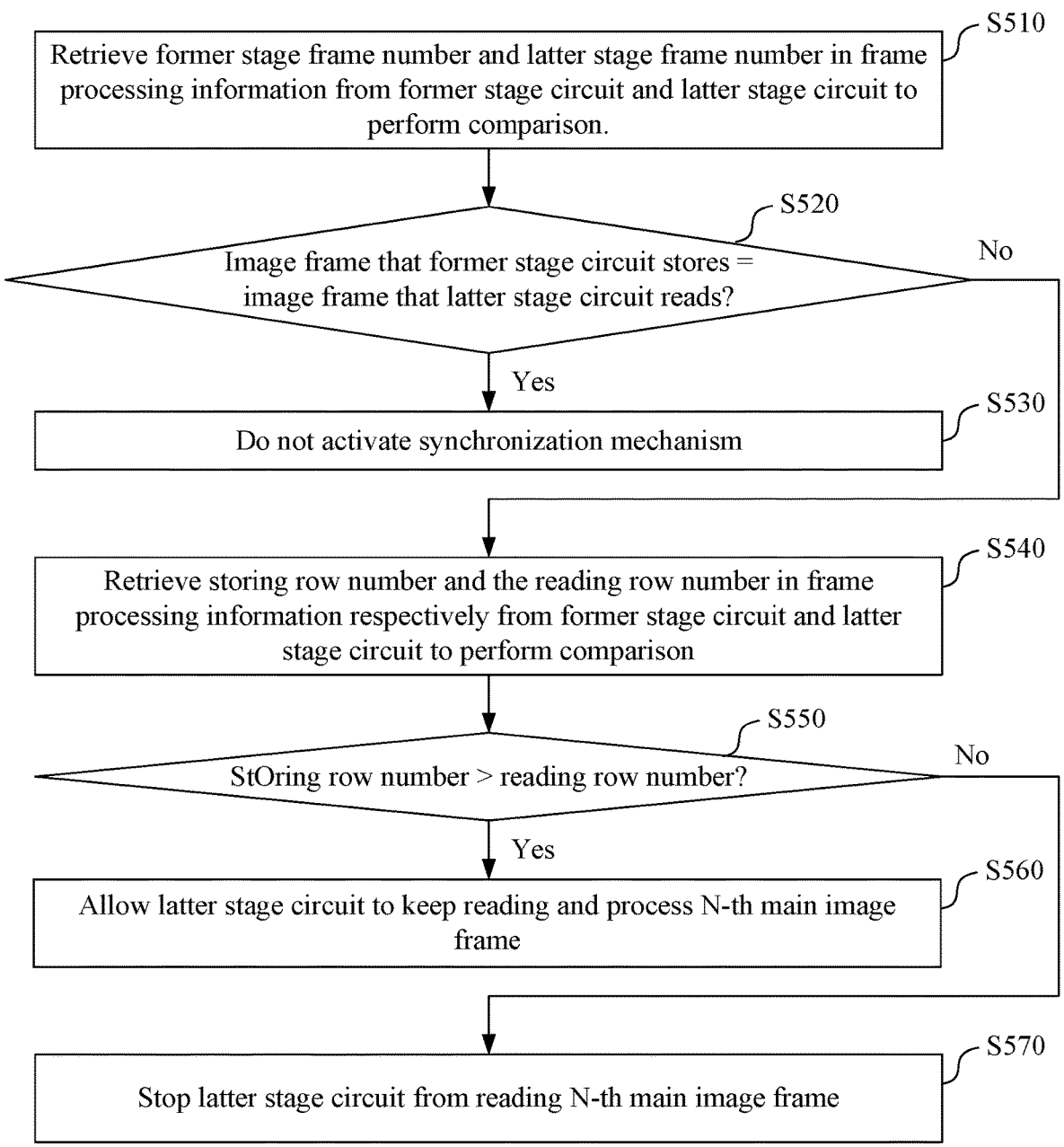
FIG. 5 is a flow chart of a synchronization flow performed during the operation of the synchronization circuit in an embodiment of the present invention.

Reference is now made to FIG. 5 at the same time. FIG. 5 is a flow chart of a synchronization flow 500 performed during the operation of the synchronization circuit 150 in an embodiment of the present invention. The operation mechanism of the synchronization circuit 150 is further described in detail in accompany with FIG. 4 and FIG. 5 in the following paragraphs.

Step S510: As illustrated in FIG. 5, the first comparison module 400 retrieves the former stage frame number F1 and the latter stage frame number F2 in the frame processing information FP1 and the frame processing information FP2 respectively from the former stage circuit 120 and the latter stage circuit 130 to perform comparison.

Step S520: According to the first comparison result CR1 of the first comparison module 400, the synchronization processing module 404 further determines whether the image frame that the former stage circuit 120 currently stores and the image frame that the latter stage circuit 130 currently reads are the same image frame.

Step S530: When the image frame that the former stage circuit 120 currently stores and the image frame that the latter stage circuit 130 currently reads are not the same image frame, e.g. the condition within the first sub period $T_{S1}$ of the image frame processing time period $T_N$, in which the latter stage circuit 130 reads the N−1-th sub image frame and the former stage circuit 120 stores the N-th main image frame, the synchronization processing module 404 does not activate the synchronization mechanism of the synchronization circuit 150.

Step S540: When the image frame that the former stage circuit 120 currently stores and the image frame that the latter stage circuit 130 currently reads are the same image frame, e.g. the condition within the second sub period $T_{S2}$ of the image frame processing time period $T_N$, in which the latter stage circuit 130 reads the N-th sub image frame and the former stage circuit 120 also stores the N-th main image frame, the synchronization processing module 404 activates the synchronization mechanism of the synchronization circuit 150. The second comparison module 402 retrieves the storing row number RW and the reading row number RR in the frame processing information FP1 and FP2 respectively from the former stage circuit 120 and the latter stage circuit 130 to perform comparison.

Figure 6:
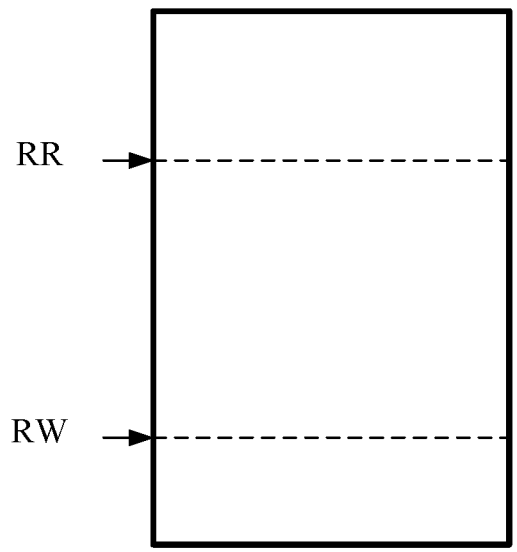
FIG. 6 is a diagram of the main image frame in an embodiment of the present invention.

Reference is now made to FIG. 6 at the same time. FIG. 6 is a diagram of the main image frame 600 in an embodiment of the present invention.

Step S550: According to the second comparison result CR2 of the second comparison module 402, the synchronization processing module 404 determines whether the storing row number RW of the main image frame 600 that the former stage circuit 120 currently stores exceeds the reading row number RR of the main image frame 600 that the latter stage circuit 130 currently reads.

Step S560: When the storing row number RW exceeds the reading row number RR, the content read by the latter stage circuit 130 does not exceed the content stored by the former stage circuit 120. As a result, by delivering a latter stage circuit control signal CC1, the synchronization processing module 404 allows the latter stage circuit 130 to keep reading the N-th main image frame and process the N-th main image frame.

Step S570: On the contrary, when the storing row number RW does not exceed the reading row number RR, the content read by the latter stage circuit 130 exceeds the content stored by the former stage circuit 120. As a result, by delivering the latter stage circuit control signal CC1, the synchronization processing module 404 stops the latter stage circuit 130 from reading the N-th main image frame to avoid the reading of the incorrect data content.

As a result, under the coordination and the synchronization of the synchronization circuit 150, the latter stage circuit 130 can read the content of the N-th main image frame in an order to process the N-th main image frame and generate the main image frame corresponding to the processed main image stream EMS. It is appreciated that in the present embodiment, the latter stage circuit 130 finishes processing the N-th main image frame before the next synchronization signal time period $TS_{N+1}$.

Furthermore, within the image frame processing time period $T_{N+1}$, the former stage circuit 120 can store the N+1-th sub image frames of the sub image streams SS1 and SS2 and the N+1-th main image frame of the main image stream MS by using the method described above.

Further, by using the method described above, the latter stage circuit 130 can read and process the N-th sub image frames of the sub image streams SS1 and SS2 first and subsequently reads and processes the N+1-th main image frame of the main image stream MS.

It is appreciated that in an embodiment, the current first sub image storage block 114A and the second sub image storage block 116A that the former stage circuit 120 uses to store the N-th sub image frames of the sub image streams SS1 and SS2 within the image frame processing time period $T_N$ become the previous sub image storage blocks in the image frame processing time period $T_{N+1}$. The previous first sub image storage block 114B and the previous second sub image storage block 116B in the image frame processing time period $T_N$ becomes current sub image storage block in the image frame processing time period $T_{N+1}$ and are used to store the N+1-th sub image frames of the sub image streams SS1 and SS2.

The embodiments described above use the condition that the capacity of the main image storage block 112 is larger than or equals to the size of the N-th main image frame as an example. In another embodiment, the capacity of the main image storage block 112 can be smaller than the size of the N-th main image frame and the main image storage block 112 operates as a ring buffer. In other words, when the part of the main image frame stored by the former stage circuit 120 reaches the highest address of the main image storage block 112, the latest data of the image frame further replaces the lowest address of the main image storage block 112. When the part of the main image frame read by the latter stage circuit 130 reaches the highest address of the main image storage block 112, the data is kept reading from the lowest address of the main image storage block 112.

Figure 7:
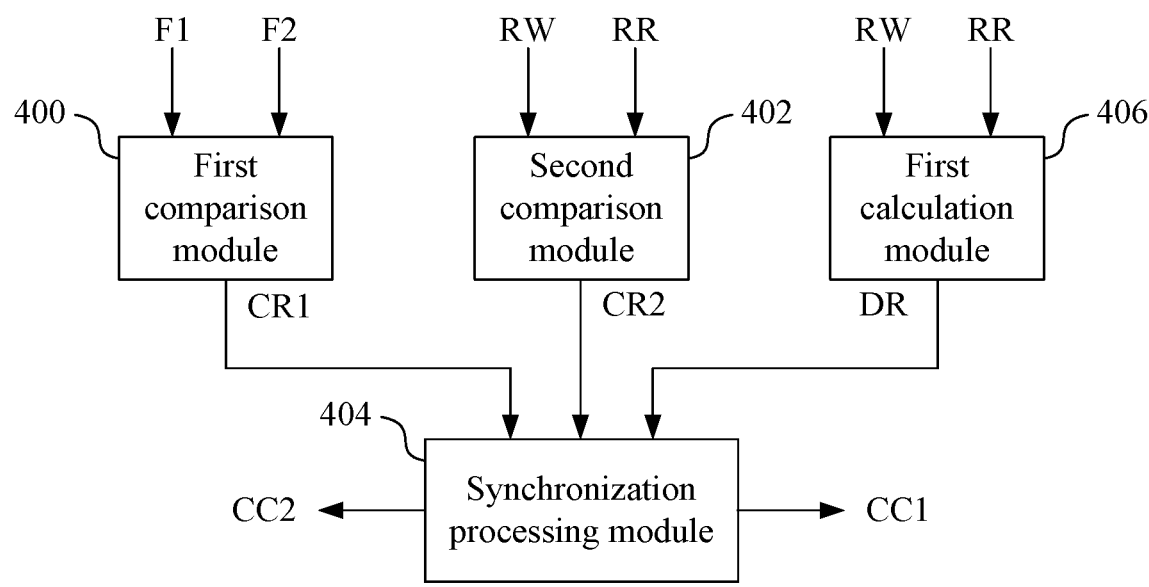
FIG. 7 is a block diagram of the synchronization circuit in another embodiment of the present invention.
Figure 8:
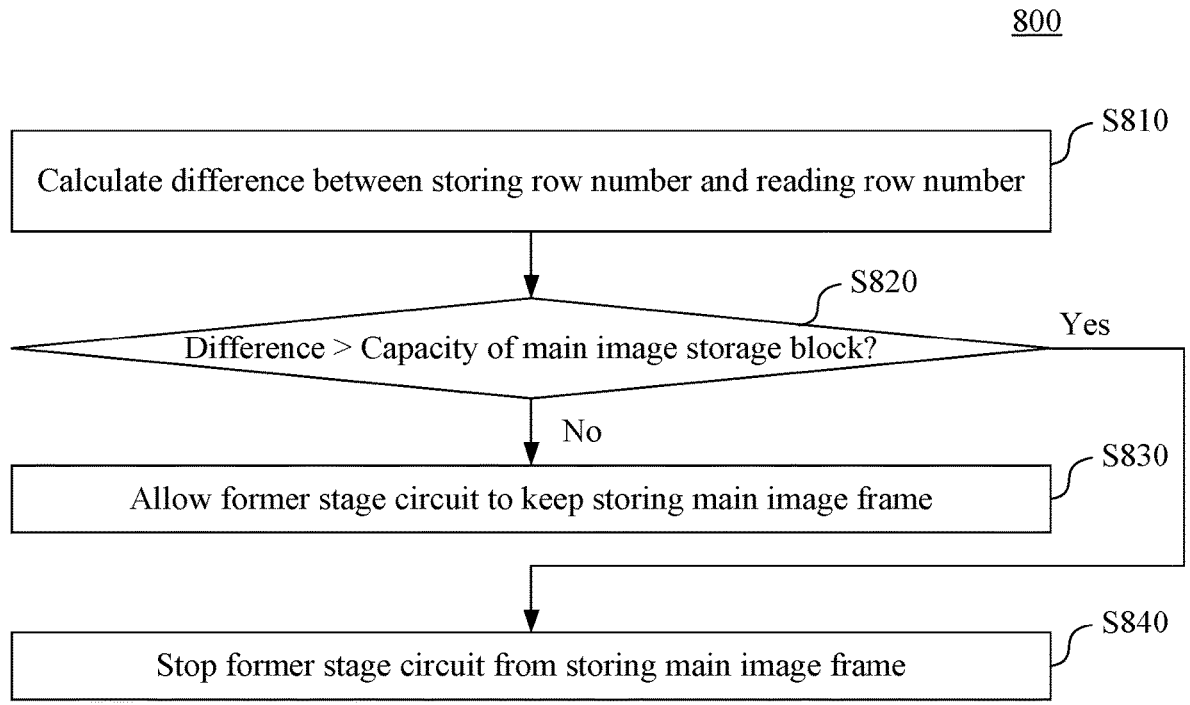
FIG. 8 is a flow chart of a synchronization flow performed during the operation of the synchronization circuit in another embodiment of the present invention.

Reference is now made to FIG. 7 and FIG. 8 at the same time. FIG. 7 is a block diagram of the synchronization circuit 150 in another embodiment of the present invention. FIG. 8 is a flow chart of a synchronization flow 800 performed during the operation of the synchronization circuit 150 in another embodiment of the present invention. The embodiment of the main image storage block 112 that operates as the ring buffer is further described in detail in accompany with FIG. 7 and FIG. 8 in the following paragraphs.

The synchronization circuit 150 illustrated in FIG. 7 is similar to the synchronization circuit 150 illustrated in FIG. 4 and includes the first comparison module 400, the second comparison module 402 and the synchronization processing module 404. In the present embodiment, the synchronization circuit 150 illustrated in FIG. 7 further includes a first calculation module 406. The first calculation module 406 is configured to calculate a difference DR between the storing row number RW and the reading row number RR according to the frame processing information FP1 and FP2.

Besides the flow including the steps S510 to S570 illustrated in FIG. 5, the synchronization mechanism performed by the synchronization circuit 150 illustrated in FIG. 7 further includes the flow illustrated in FIG. 8.

Step S810: The first calculation module 406 calculates the difference DR between the storing row number RW and the reading row number RR.

Step S820: The synchronization processing module 404 determines whether the difference DR exceeds the capacity of the main image storage block 112.

Step S830: When the difference DR does not exceed the capacity of the main image storage block 112, the internal effective content that is not encoded does not fully occupy the capacity of the main image storage block 112. As a result, by using the former stage circuit control signal CC2, the synchronization processing module 404 allows the former stage circuit 120 to keep storing the N-th main image frame.

Step S840: On the contrary, when the difference DR exceeds the capacity of the main image storage block 112, the speed that the former stage circuit 120 stores the main image frame is faster than the speed that the latter stage circuit 130 reads the main image frame. If the storing is kept being performed, the data of the main image frame that the latter stage circuit 130 has not read yet is going to be replaced. As a result, by using the former stage circuit control signal CC2, the synchronization processing module 404 stops the former stage circuit 120 from storing the N-th main image frame. The storing of the data of the main image frame is therefore stopped temporarily.

As a result, by using the mechanism described above, the embodiment of the main image storage block 112 operating as a ring buffer not only avoids the condition that the incorrect data is read when the speed of the read operation of the latter stage circuit 130 is too fast, but also avoids the condition that the data that the latter stage circuit 130 has not read is replaced when the speed of the storage operation of the former stage circuit 120 is too fast.

Figure 9:
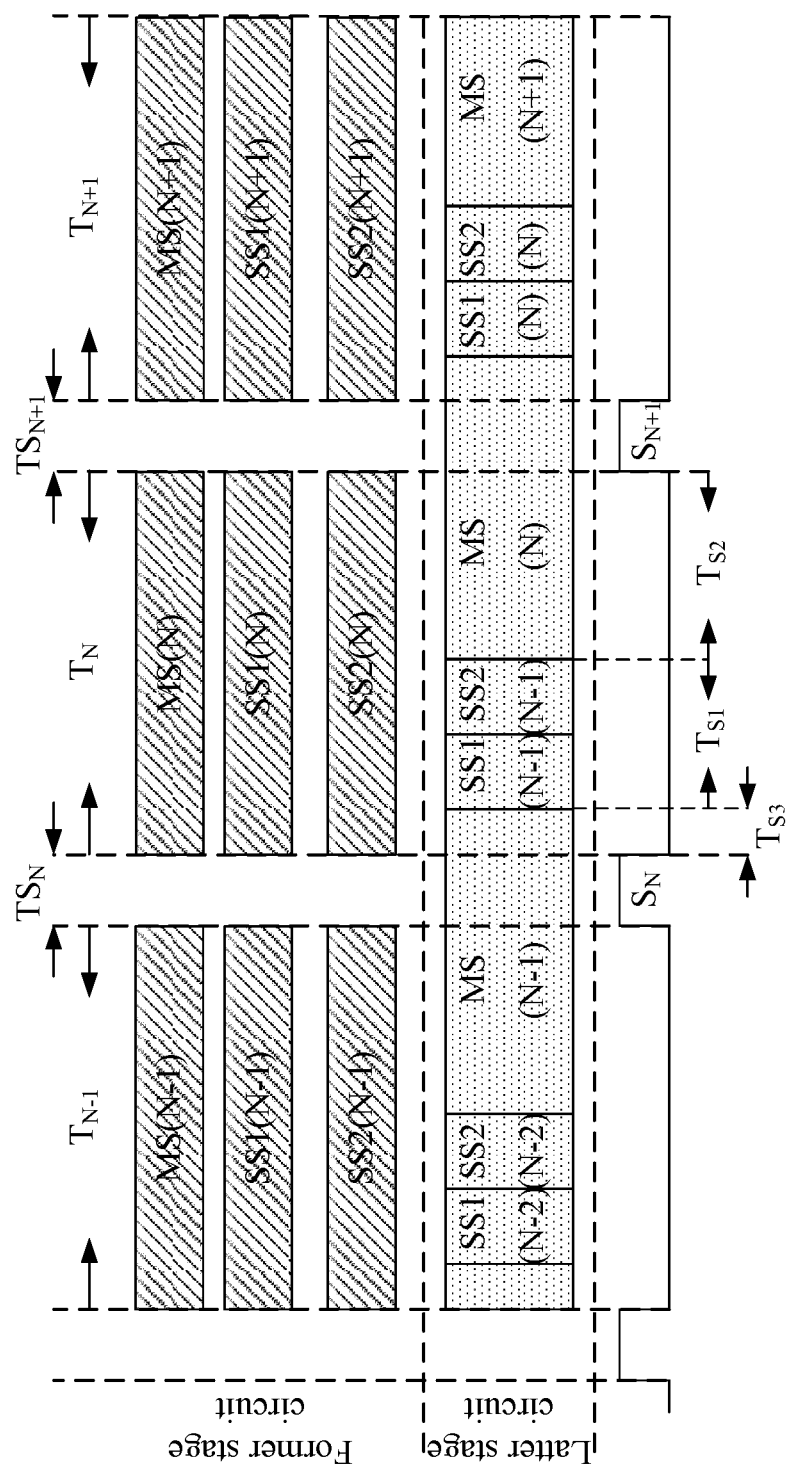
FIG. 9 is a timing diagram of the image processing performed by the multi-stream image processing apparatus in another embodiment of the present invention.

Reference is now made to FIG. 9 at the same time. FIG. 9 is a timing diagram of the image processing performed by the multi-stream image processing apparatus 100 in another embodiment of the present invention.

The time sequence during the processing of the multi-stream image processing apparatus 100 includes a plurality of image frame processing time periods, such as the consecutive three image frame processing time periods $T_{N-1}$, $T_N$ and $T_{N+1}$ exemplarily illustrated in FIG. 9. Each two adjacent image frame processing time periods include a synchronization signal time period therebetween, such as the synchronization signal time period $TS_N$ between the image frame processing time periods $T_{N-1}$ and $T_N$, and the synchronization signal time period $TS_{N+1}$ between the image frame processing time periods $T_N$ and $T_{N+1}$. The synchronization signal time periods $TS_N$ and $TS_{N+1}$ respectively correspond to the transmission of the synchronization signals $S_N$ and $S_{N+1}$ to respectively mark the beginning of the image frame processing time periods $T_N$ and $T_{N+1}$.

In the present embodiment, during the first sub period $T_{S1}$ in the image frame processing time period $T_N$, the latter stage circuit 130 still reads and processes the N-1-th sub image frames of the sub image streams SS1 and SS2. During the second sub period $T_{S2}$ in the image frame processing time period $T_N$, the latter stage circuit 130 still reads and processes the N-th main image frame.

However, in the present embodiment, besides the feature that the main image storage block 112 is implemented by a ring buffer, the image frame processing time period $T_N$ further includes a third sub period $T_{S3}$ before the first sub period $T_{S1}$. For the N-1-th main image frame that the image frame processing time period $T_{N-1}$ corresponds to, the latter stage circuit 130 not only processes the N-1-th main image frame in a latter part of the image frame processing time period $T_{N-1}$, but also processes the N-1-th main image frame in the synchronization signal time period $TS_N$ and the third sub period $T_{S3}$. Identically, the latter stage circuit 130 can also process the N-th main image frame in the latter part of the image frame processing time period $T_N$, the synchronization signal time period $TS_{N+1}$ and the third sub period $T_{S3}$ in the image frame processing time period $T_{N+1}$.

However, for the former stage circuit 120, the N-th sub image frames of the sub image streams SS1 and SS2 and the N-th main image frame of the main image stream MS are still stored from the beginning of the image frame processing time period $T_N$. As a result, within the third sub period $T_{S3}$, the N-1-th main image frame is read and the N-th main image frame is stored simultaneously in the main image storage block 112. The advantage of applying the third sub period $T_{S3}$ is that the latter stage circuit can perform data processing with a slower speed and accomplish a power-saving mechanism.

Figure 10:
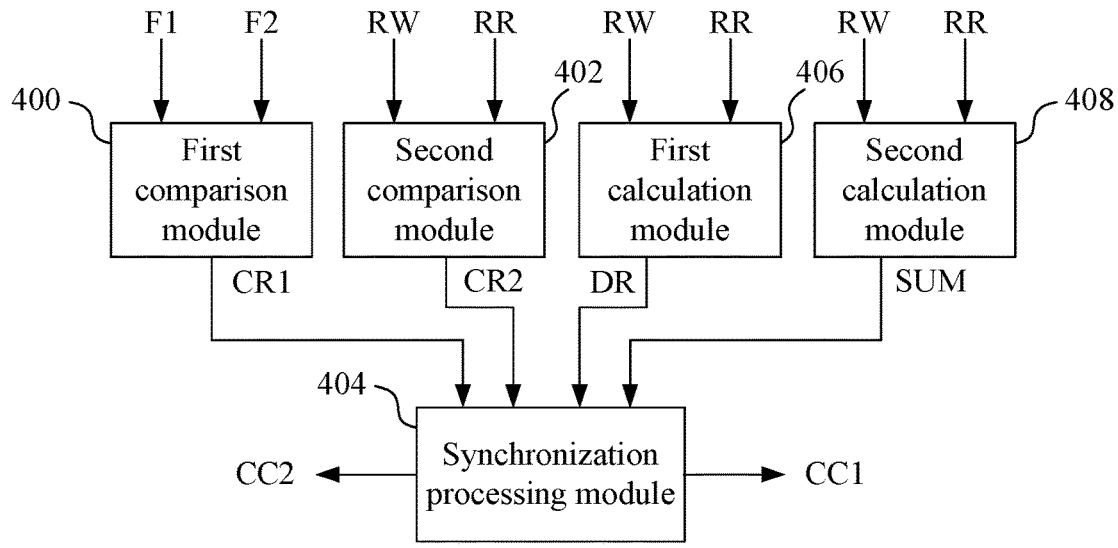
FIG. 10 is a block diagram of the synchronization circuit in yet another embodiment of the present invention.
Figure 11:
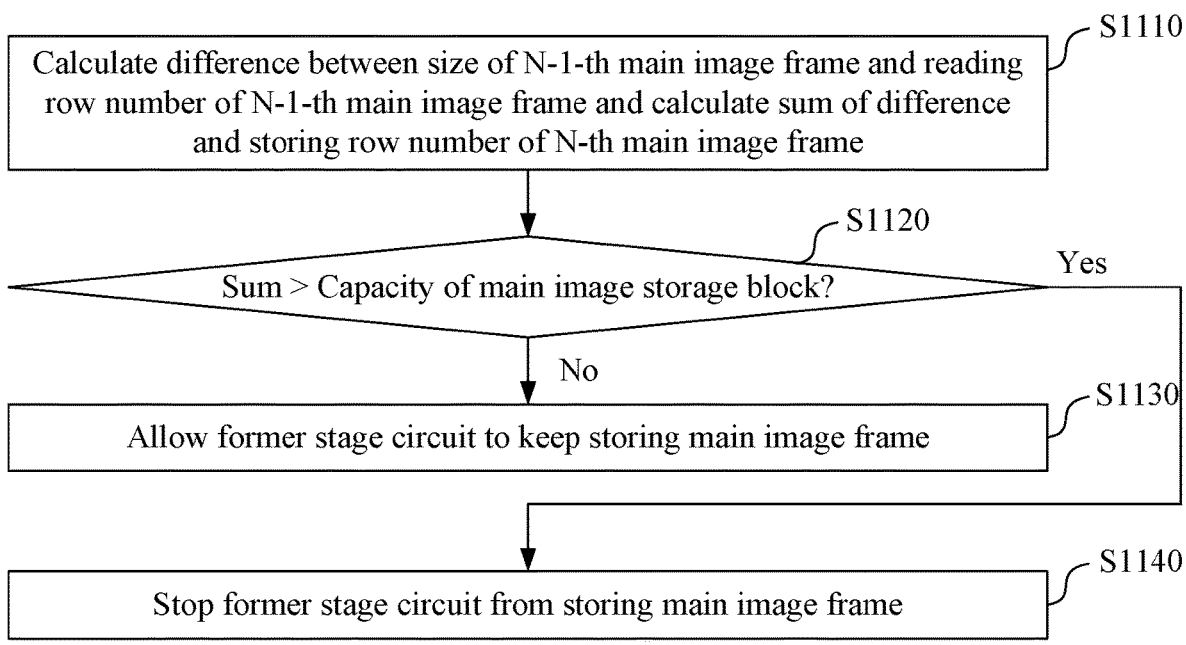
FIG. 11 is a flow chart of a synchronization flow performed during the operation of the synchronization circuit in yet another embodiment of the present invention.

Reference is now made to FIG. 10 and FIG. 11 at the same time. FIG. 10 is a block diagram of the synchronization circuit 150 in yet another embodiment of the present invention. FIG. 11 is a flow chart of a synchronization flow 1100 performed during the operation of the synchronization circuit 150 in yet another embodiment of the present invention. The embodiment of the main image storage block 112 that operates as the ring buffer is further described in detail in accompany with FIG. 10 and FIG. 11 in the following paragraphs.

The synchronization circuit 150 illustrated in FIG. 10 is similar to the synchronization circuit 150 illustrated in FIG. 7 and includes the first comparison module 400, the second comparison module 402, the synchronization processing module 404 and the first calculation module 406. In the present embodiment, the synchronization circuit 150 illustrated in FIG. 10 further includes a second calculation module 408. The second calculation module 408 is configured to operate when the image frame that the former stage circuit 120 currently stores and the image frame that the latter stage circuit 130 currently reads are different.

The synchronization mechanism performed by the synchronization circuit 150 illustrated in FIG. 10 includes the flow including the steps S510, S520 and S540 to S570 illustrated in FIG. 5 and the flow including the steps S810 to S840 illustrated in FIG. 8. However, in the present embodiment, when the image frame that the former stage circuit 120 currently stores and the image frame that the latter stage circuit 130 currently reads are determined to be different in the step S520 in FIG. 5, e.g. the condition illustrated in the third sub period $T_{S3}$, the synchronization circuit 150 illustrated in FIG. 10 operates the flow illustrated in FIG. 11 to activate the synchronization mechanism.

Step S1110: According to the frame processing information FP1 and FP2, the second calculation module 408 calculates a difference between the size FR of the N-1-th main image frame and the reading row number RR of the N-1-th main image frame. Such a difference stands for the remained data amount in the N-1-th main image frame that is not read and processed by the latter stage circuit 130. Subsequently, the second calculation module 408 calculates a sum SUM of the difference and the storing row number RW of the N-th main image frame. The storing row number RW stands for the data amount in the N-th main image frame that the former stage circuit 120 is stored.

Step S1120: the synchronization processing module 404 determines whether the sum SUM exceeds the capacity of the main image storage block 112.

Step S1130: When the sum SUM does not exceed the capacity of the main image storage block 112, the speed that the former stage circuit 120 performs storage operation does not exceed the speed that the latter stage circuit 130 performs read operation. As a result, by using the former stage circuit control signal CC2, the synchronization processing module 404 allows the former stage circuit 120 to keep storing the N-th main image frame.

Step S1140: On the contrary, when the sum SUM exceeds the capacity of the main image storage block 112, the speed that the former stage circuit 120 performs storage operation exceeds the speed that the latter stage circuit 130 performs read operation. If the storing is kept being performed, the data of the main image frame that the latter stage circuit 130 has not read yet is going to be replaced. As a result, by using the former stage circuit control signal CC2, the synchronization processing module 404 stops the former stage circuit 120 from storing the N-th main image frame. The storing of the data of the main image frame is therefore stopped temporarily.

As a result, the multi-stream image processing apparatus 100 of the present invention can use a single latter stage circuit to process the plurality of image streams generated by the former stage circuit with a time-division method to avoid the cost of disposition of a plurality of latter stage circuits.

Further, by using the time-division method, the memory module only needs to store N−1-th sub image frame and the N-th sub image frame corresponding to the sub image frames having a lower data amount due to the lower resolution. For the main image frame having a higher data amount due to the higher resolution, the disposition of two storage blocks is not necessary. The space cost of the memory module can be reduced as well.

Furthermore, by disposing the synchronization circuit, the memory module can include the main image storage block implemented by the ring buffer. The capacity can be reduced to further reduce the space cost of the memory module.

It is appreciated that the embodiments described above are merely an example. In other embodiments, it should be appreciated that many modifications and changes may be made by those of ordinary skill in the art without departing, from the spirit of the invention.

In summary, the multi-stream image processing apparatus and the multi-stream image processing method of the present invention can reduce the hardware disposition cost of the latter stage circuit and the space cost of the memory.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A multi-stream image processing method, comprising:
generating a plurality of image streams by a former stage circuit according to a same image source, wherein the image streams comprise a main image stream and at least one sub image stream, and a resolution of the main image stream is higher than a resolution of the sub image stream, and the main image stream comprises a plurality of main image frames and the sub image stream comprises a plurality of sub image frames;
processing the main image stream and the sub image stream for a plurality of image frame processing time periods, each comprising a first sub period and a second sub period behind the first sub period, to generate a processed main image stream and at least one processed sub image stream, wherein for an N-th image frame processing time period:
storing an N-th sub image frame of the sub image stream by the former stage circuit in at least one current sub image storage block of a memory module during the N-th image frame processing time period;
storing an N-th main image frame of the main image stream by the former stage circuit in a main image storage block of the memory module during the N-th image frame processing time period;
reading and processing an N−1-th sub image of the sub image stream stored in a previous sub image storage block of the memory module by a latter stage circuit during the first sub period of the N-th image frame processing time period, to generate an N−1-th processed sub image frame in the processed sub image stream; and
reading and processing the N-th main image frame stored in the main image storage block by the latter stage circuit during the second sub period of the N-th image frame processing time period, to generate an N-th processed main image frame in the processed main image stream.

2. The multi-stream image processing method of claim 1, wherein a capacity of the main image storage block is larger than or equals to a size of the N-th main image frame.

3. The multi-stream image processing method of claim 1, further comprising:
retrieving frame processing information of the former stage circuit and the latter stage circuit by a synchronization circuit;
determining whether a storing row number of the N-th main image frame that the former stage circuit currently stores exceeds a reading row number of the N-th main image frame that the latter stage circuit currently reads according to the frame processing information by the synchronization circuit;
when the storing row number exceeds the reading row number, allowing the latter stage circuit to keep reading the N-th main image frame and process the N-th main image frame; and
when the storing row number does not exceed the reading row number, stopping the latter stage circuit from reading the N-th main image frame.

4. The multi-stream image processing method of claim 3, wherein a capacity of the main image storage block is smaller than a size of the N-th main image frame, and the main image storage block operates as a ring buffer, the multi-stream image processing method further comprises:
determining whether a difference between the storing row number and the reading row number exceeds the capacity of the main image storage block according to the frame processing information by the synchronization circuit;
when the difference does not exceed the capacity of the main image storage block, allowing the former stage circuit to keep storing the N-th main image frame; and when the difference exceeds the capacity of the main image storage block, stopping the former stage circuit from storing the N-th main image frame.

5. The multi-stream image processing method of claim 1, wherein a synchronization signal time period is presented between the image frame processing time period and a former image frame processing time period, the former stage circuit and the latter stage circuit do not perform data processing during the synchronization signal time period.

6. The multi-stream image processing method of claim 1, wherein a capacity of the main image storage block is smaller than a size of the N-th main image frame, and the main image storage block operates as a ring buffer, a synchronization signal time period is presented between the image frame processing time period and a former image frame processing time period, the multi-stream image processing method further comprises:
   reading an N−1-th main image frame stored in the main image storage block by the latter stage circuit and processing the N−1-th main image frame by the latter stage circuit during a third sub period, wherein the third sub period is during the synchronization signal time period and during a section of the image frame processing time period that is before the first sub period;
   retrieving frame processing information of the former stage circuit and the latter stage circuit by a synchronization circuit;
   calculating a difference between a size of the N−1-th main image frame and a reading row number of the N−1-th main image frame that the latter stage circuit currently reads according to the frame processing information by the synchronization circuit;
   determining whether a sum of the difference and a storing row number of the N-th main image frame that the former stage circuit currently stores exceeds the capacity of the main image storage block according to the frame processing information by the synchronization circuit;
   when the sum does not exceed the capacity of the main image storage block, allowing the former stage circuit to keep storing the N-th main image frame; and
   when the sum exceeds the capacity of the main image storage block, stopping the former stage circuit from storing the N-th main image frame.

7. The multi-stream image processing method of claim 1, wherein the former stage circuit is an image signal processor and the latter stage circuit is an encoder.

8. A multi-stream image processing apparatus, comprising:
   a memory module;
   a former stage circuit;
   a latter stage circuit; and
   a processing circuit electrically coupled to the memory module, the former stage circuit and the latter stage circuit, and configured to execute a plurality of software or firmware executable commands to execute a multi-stream image processing method, wherein the multi-stream image processing method comprises:
      generating a plurality of image streams by the former stage circuit according to a same image source, wherein the image streams comprise a main image stream and at least one sub image stream, and a resolution of the main image stream is higher than a resolution of the sub image stream, and the main image stream comprises a plurality of main image frames and the sub image stream comprises a plurality of sub image frames;
      processing the main image stream and the sub image stream for a plurality of image frame processing time periods, each comprising a first sub period and a second sub period behind the first sub period, to generate a processed main image stream and at least one processed sub image stream, wherein for an N-th image frame processing time period:
         storing an N-th sub image frame of the sub image stream by the former stage circuit in at least one current sub image storage block of a memory module during the N-th image frame processing time period;
         storing an N-th main image frame of the main image stream by the former stage circuit in a main image storage block of the memory module during the N-th image frame processing time period;
         reading and processing an N−1-th sub image frame of the sub image stream stored in a previous sub image storage block of the memory module by the latter stage circuit during the first sub period of the N-th image frame processing time period, to generate an N−1-th processed sub image frame in the processed sub image stream; and
         reading and processing the N-th main image frame stored in the main image storage block by the latter stage circuit during the second sub period of the N-th image frame processing time period, to generate an N-th processed main image frame in the processed main image stream.

9. The multi-stream image processing apparatus of claim 8, wherein a capacity of the main image storage block is larger than or equals to a size of the N-th main image frame.

10. The multi-stream image processing apparatus of claim 8, further comprising a synchronization circuit electrically coupled to the processing circuit, the former stage circuit and the latter stage circuit, the multi-stream image processing method further comprises:
   retrieving frame processing information of the former stage circuit and the latter stage circuit by a synchronization circuit;
   determining whether a storing row number of the N-th main image frame that the former stage circuit currently stores exceeds a reading row number of the N-th main image frame that the latter stage circuit currently reads according to the frame processing information by the synchronization circuit;
   when the storing row number exceeds the reading row number, allowing the latter stage circuit to keep reading the N-th main image frame and process the N-th main image frame; and
   when the storing row number does not exceeds the reading row number, stopping the latter stage circuit from reading the N-th main image frame.

11. The multi-stream image processing apparatus of claim 10, wherein a capacity of the main image storage block is smaller than a size of the N-th main image frame, and the main image storage block operates as a ring buffer, the multi-stream image processing method further comprises:
   determining whether a difference between the storing row number and the reading row number exceeds the capacity of the main image storage block according to the frame processing information by the synchronization circuit;
   when the difference does not exceed the capacity of the main image storage block, allowing the former stage circuit to keep storing the N-th main image frame; and when the difference exceeds the capacity of the main image storage block, stopping the former stage circuit from storing the N-th main image frame.

12. The multi-stream image processing apparatus of claim 8, wherein a synchronization signal time period is presented between the image frame processing time period and a former image frame processing time period, the former stage circuit and the latter stage circuit do not perform data processing during the synchronization signal time period.

13. The multi-stream image processing apparatus of claim 8, further comprising a synchronization circuit electrically coupled to the processing circuit, the former stage circuit and the latter stage circuit, wherein a capacity of the main image storage block is smaller than a size of the N-th main image frame, and the main image storage block operates as a ring buffer, a synchronization signal time period is presented between the image frame processing time period and a former image frame processing time period, the multi-stream image processing method further comprises:

reading an N−1-th main image frame stored in the main image storage block by the latter stage circuit and processing the N−1-th main image frame by the latter stage circuit during a third sub period, wherein the third sub period is during the synchronization signal time period and during a section of the image frame processing time period that is before the first sub period;

retrieving frame processing information of the former stage circuit and the latter stage circuit by a synchronization circuit;

calculating a difference between a size of the N−1-th main image frame and a reading row number of the N−1-th main image frame that the latter stage circuit currently reads according to the frame processing information by the synchronization circuit;

determining whether a sum of the difference and a storing row number of the N-th main image frame that the former stage circuit currently stores exceeds the capacity of the main image storage block according to the frame processing information by the synchronization circuit;

when the sum does not exceed the capacity of the main image storage block, allowing the former stage circuit to keep storing the N-th main image frame; and when the sum exceeds the capacity of the main image storage block, stopping the former stage circuit from storing the N-th main image frame.

14. The multi-stream image processing apparatus of claim 8, wherein the former stage circuit is an image signal processor and the latter stage circuit is an encoder.

* * * * *